United States Patent [19]

Nakatsu

[11] Patent Number: 5,249,725
[45] Date of Patent: Oct. 5, 1993

[54] APPARATUS FOR RE-USING WIRES USED ONCE FOR MASH SEAM WELDING

[75] Inventor: Minoru Nakatsu, Mie, Japan

[73] Assignee: N.P.W. Technical Laboratory Co., Mie, Japan

[21] Appl. No.: 914,523

[22] Filed: Jul. 17, 1992

[30] Foreign Application Priority Data

Jul. 30, 1991 [JP] Japan .................. 3-212660

[51] Int. Cl.⁵ .............................................. B23K 11/06
[52] U.S. Cl. .......................................... 228/5.5; 228/8; 228/106; 219/64; 219/81
[58] Field of Search ................ 228/102, 106, 150, 5.5, 228/8, 44.3; 219/64, 81, 84; 72/52

[56] References Cited

U.S. PATENT DOCUMENTS 4,652,715 3/1987 Kitamura et al. ............... 219/64
4,732,026 3/1988 Ban ................................... 228/150

Primary Examiner—Samuel M. Heinrich
Attorney, Agent, or Firm—Sughrue, Mion, Zinn, Macpeak & Seas

[57] ABSTRACT

The invention is related to an apparatus for re-using a copper wire having been used once for mash seam welding in a mash seam welder for mash seam welding a lap formed by overlapped opposite side edges of a metal sheet or like blank between upper and lower roller electrodes via copper wires. The apparatus is provided in a portion of or in relation to the mash seam welder for taking up the copper wire having been used once for welding and squeezed to have a substantially flat sectional profile as taken-up wire and feeding again the taken-up wire as rewound wire to the mash seam welder to be used again for welding between said upper and lower roller electrodes.

14 Claims, 5 Drawing Sheets

APPARATUS FOR RE-USING WIRES USED ONCE FOR MASH SEAM WELDING

FIELD OF THE INVENTION

This invention relates to an apparatus for re-using wires used once for mash seam welding and, more particularly, to a wire re-use apparatus for a mash seam welder for mash seam welding a lap, formed by overlapped opposite side edge portions of a metal sheet or like blank sheet curved to a cylindrical form or other form, between upper and lower roller electrodes via copper wires interposed between the lap and electrodes, the apparatus being provided in a portion of or in relation to the mash seam welder and allowing the copper wires, having been used once between the electrodes and a lap, be automatically taken up as taken-up wire on a drum instead of being discarded as scrap, and allowing the taken-up wire on the drum be rewound for supply as rewound wire, after checking the rewound wire for re-use capability, for the mash seam welder for welding between the upper and lower roller electrodes.

The copper wires may be replaced with wires made of copper alloys or other metals or alloys thereof having excellent thermal conductivity and certain rigidity.

In the following description, the wire used once for mash seam welding, and squeezed to a substantially flat form, are referred to as taken-up wire when it is taken up on the drum and as rewound wire when it is rewound from the drum and for use in the mash seam welder.

PRIOR ART

Heretofore, welding of opposite edges of a blank sheet, made of steel or other metals, has been carried out by butt welding or seam welding. Seam welding, which is a resistance welding process, has been known in the art as one method for welding a lap formed by overlapped opposite edge portions of a blank. This welding process is called seam welding for the lap, i.e., overlapped edge portions, is seamed. By seam welding, a weld zone having an excellent seal property can be obtained from the lap, i.e., overlapped opposite edge portions of a blank sheet formed to a cylindrical shape. Therefore, this welding process is said to be suited for welding of transport pipes for transporting liquids or the like, fuel tanks, drum cans, food stuff cans, etc.

The most usual seam welding process is a lap seam welding process, in which the overlapped blank edges are seam welded. More specifically, in this process a lap formed by overlapped opposite edge portions of a blank sheet of steel or other metals, is pressed between paired disk-like electrodes, i.e., upper and lower roller electrodes, whereby the lap is energized, heated and resistance welded between the upper and lower roller electrodes under pressure. The most usual resistance welding process is a spot welding process. In this process, spot welding is performed repeatedly for successive spots along the lap between the upper and lower roller electrodes. More specifically, during welding the lap is energized intermittently and regularly between the two roller electrodes. Consequently, the lap is repeatedly partially thermally fused by the Joule heat produced by the energizing power to generate a continuous weld along the lap. Thus, in the seam weld zone the overlapped edges of a steel plate or like blank are bound together just like by the continuous weld. It is thus said that the weld zone has excellent in the gas or water tightness.

In the prior art seam welding, the width of the contact surfaces of the upper and lower roller electrodes is smaller than the width of the lap, and therefore, there remain non welded portions of the lap on the opposite sides of the weld zone. To cope with this, it is common practice to seal the non-welded portions on the opposite sides of the weld zone with a synthetic resin cover, since the synthetic resin is difficult to apply to the non-welded portions. This method has disadvantages in that corrosion is liable to form from the non-welded portions. Also, the user's hand is occasionally cut by the non-welded portions during handling.

Mask seam welding has been proposed and practiced as a welding process, which does not leave any non-welded portions.

In the mash seam welding process, while the lap is pressed and fused for welding with the upper and lower roller electrodes having contact surfaces greater in width than the lap width, the edges of the lap are mashed, thus effecting the process. In this seam welding, unlike the usual seam welding process, the weld zone has an oblique sectional profile. Thus, no non-welded portions are left on the opposite sides of the weld zone. In addition, spot welds are formed continuously as a result of thermal fusing in the weld zone. Thus, in the weld zone the welding surfaces are press bonded uniformly to provide for high mechanical strength and quality. The process is therefore said to be suitable particularly for the manufacture of drink cans and food cans.

For the the material of the beverage cans and food cans, great use is made of surface treated steel sheets such as commonly called plated steel sheets, obtained by plating rolled steel sheet, with tin or alloys thereof for corrosion resistance. However, when the lap formed by overlapped opposite edges of a blank sheet using such surface treated steel sheet is mash seam welded between the upper and lower roller electrodes as noted above, there is a problem: Namely at the time of the welding the surface cover metal such as tin migrates to the outer peripheral surfaces of the upper and lower roler electrodes, i. e., the electrode surfaces in contact with the lap are contaminated. Accordingly, there are methods and apparatus for removing the contaminant such as tin from the outer peripheral surfaces of the upper and lower roller electrodes. In practice, however, such methods or apparatus cannot remove the contaminant. Further, in view of the high speed and continuous manufacturing of food cans or drink cans it is practically impossible to clean the roller electrode outer peripheral surfaces every time the lap of a food can or the like is welded.

As an improvement over this prior art mash seam welding process, there have been proposed a method and an apparatus, in which the surface treated steel sheet is mash seam welded between upper and lower roller electrodes utilizing copper wires on the outer peripheral surfaces of the upper and lower roller electrodes. In theis method, the copper wires are accommodated in copper wire accomodation grooves formed circumferentially along the outer peripheral surfaces of the upper and lower roller electrodes and are fed by the rotation of the upper and lower roller electrodes for seam welding.

In this case, like the case of effecting the mash seam welding between the roller electrodes, the width of the contact surfaces of the copper wire has to be made greater than the width of the lap. To meet this end, a copper wire having substantially a circular sectional profile, is squeezed to obtain a flattened sectional profile for an increased contact surface width before it is used for welding.

FIG. 6 shows a status of welding in a prior art mash seam welder. Referring to FIG. 6, reference numeral 1 designates a lower welder arm, and at 2 an upper welder arm. The lower welder arm 1 is fixed, while the upper welder arm 2 is pivoted for rotation in the direction of arrow. The welder arms 1 and 2 carry respective lower and upper roller electrodes 4 and 3 mounted for rotation at their free ends. The roller electrodes 3 and 4 have their peripheral surfaces formed with wire accommodation grooves, in which copper wire 5 accommodated. The copper wire 5 is taken out from a wire supply. When it is taken out, it has a circular sectional profile, and it is first supplied to a forming unit 7 consisting of squeezing rollers 7a and 7b and is squeezed to a substantially flat sectional profile before being fed to the space between the upper and lower roller electrodes 3 and 4.

More specifically, the squeezed copper wire 5 having the flattened sectional profile is fed through a stretching unit 8 in the direction of arrows to be passed round the upper roller electrode 3 for mash seam welding. Then, it is used again the mash seam welding in the reversed state round the lower roller electrode 4. A lap of a can barrel 6 consisting of a blank sheet is fed to between the runs of the flattened copper wire 5 passed, round the upper and lower roller electrodes, and the lap is pressd and energized between the upper and lower roller electrodes between two runs of flattened copper wire. In this way, it is mash seam welded.

The copper wire 5, which has been pressed together with the lap between the upper and lower roller electrodes 3 and 4 by the mash seam welding, is pulled by a take-up pulley 9 and supplied with a wire tension given by a stretching unit 10 to the cutter 11. In the cutter 11, the copper wire 5 after use, which has been deformed by being mashed twice, is severed and discarded as scrap.

In such a mash seam welder, there is considerable deformation of the copper wire by the pressure at the time of the welding. In addition, it is possible that the plating metal such as tin has contaminated the front and back surfaces of the copper wire due to contact with the lap at the time of the welding. Further, it seems impossible to efficiently take up the substantially flat deformed copper wire on to a drum. Furthermore, the market price of copper scrap is comparatively high, therefore, the copper wire that is used once is provided as scrap to recover part of the invested cost.

However, even with a high market cost of the copper scrap, by discarding copper wire as scrap after it is used only once, a major portion of the welding cost is constituted by the price of the copper wire, leading to a very high cost of welding. This high welding cost dictates a high cost of can manufacture by welding. More specifically, at most about one-third of the cost of commercially available copper wire is recoverable. This is a grave drawback in the prior art mash seam welding using copper wire.

Prior to the proposal of the mash seam welder shown in FIG. 6, separate copper wires supplies have been used for upper and lower roller electrodes. In contrast to this, the mash seam welder shown in FIG. 6 permits a great saving of copper wire for this welder uses a single copper wire.

In view of this, the inventors have conducted various reseraches and investigations for long time in connection with the possibility of re-use of copper wire which has been used once. However, insofar as the subject of welding is a food can or a drink can, which concerns the health of the person who eats or drinks the content of the can, it is not permissible that there is a welding defect in even a single one of a large quantity of, for instance 1,000,000 or 10,000,000, cans provided to the market. For this reason, there has been proposed neither a method nor an apparatus for re-using copper wire which has once been used for mash seam welding.

SUMMARY OF THE INVENTION

The present invention seeks to solve the above problems, and its object is to provide an apparatus for taking up and re-using copper wire used once for mash seam welding in a mash seam welder, in which a lap formed by opposite side edges of a metal sheet or like blank is mash seam welded between upper and lower roller electrodes via copper wire mashed round the upper and lower roller electrodes, particularly the lower roller electrode, and the copper wire is taken up regularly to be rewound for re-use in the mash seam welder.

According to the invention, there is provided an apparatus for re-using a copper wire having been used once for mash seam welding in a mash seam welder for mash seam welding a lap formed by overlapped opposite side edges of a metal sheet or like blank between upper and lower roller electrodes via copper wires, which apparatus is provided in a portion of or in relation to the mash seam welder for welding and squeezed to have a substantially flat sectional profile as taken-up wire and feeding again the taken-up wire as rewound wire to the mash seam welder to be used again for welding between the upper and lower roller electrodes, and which apparatus comprises a wire shape detection unit provided between a taken-up wire feed roller for feeding the taken-up wire and a taken-up wire take-up drum for taking up the taken-up wire fed round the feed roller, the wire shape detection unit serving to detect the shape or the like of the rewound wire rewound from the take-up drum and providing a command to stop the take-out or feed of the blank from or to the mash seam welder upon detection of a defect in the wire shape or the like, and a wire braking unit provided between the wire shape detection unit and a delivery roller for delivering the rewound wire to the mash seam welder, the wire braking unit including a clutch unit for providing a brake force to the rewound wire in the direction opposite to the running direction and capable of rotation only in the direction of feed of the rewound wire.

DETAILED DESCRIPTION OF INVENTION

Figure 1:
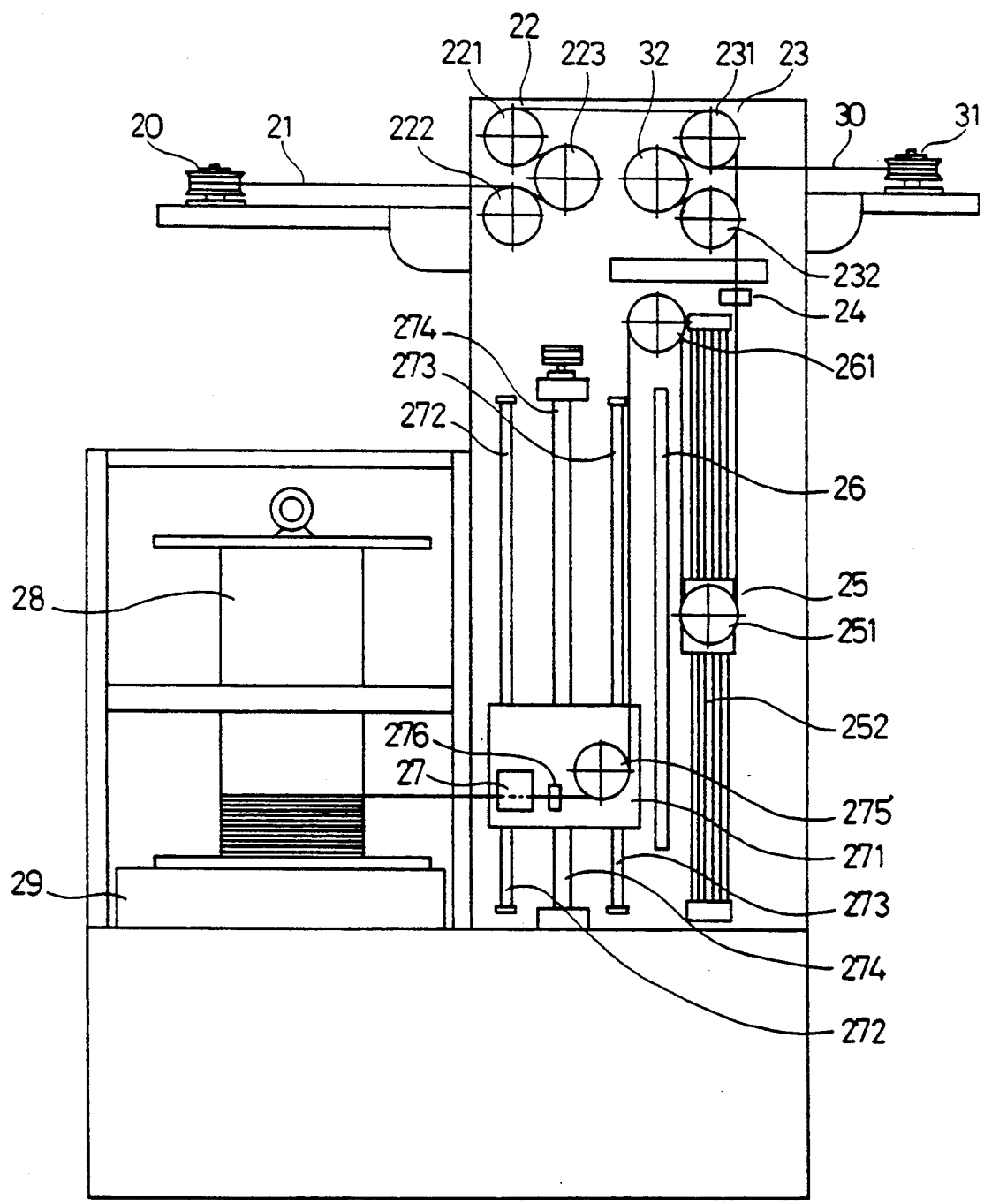
FIG. 1 is a schematic front view showing an embodiment of the apparatus according to the invention.
Figure 2:
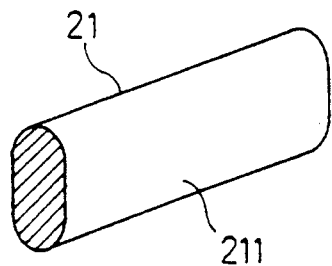
FIG. 2 is a perspective view showing a portion of an example of taken-up wire.
Figure 6:
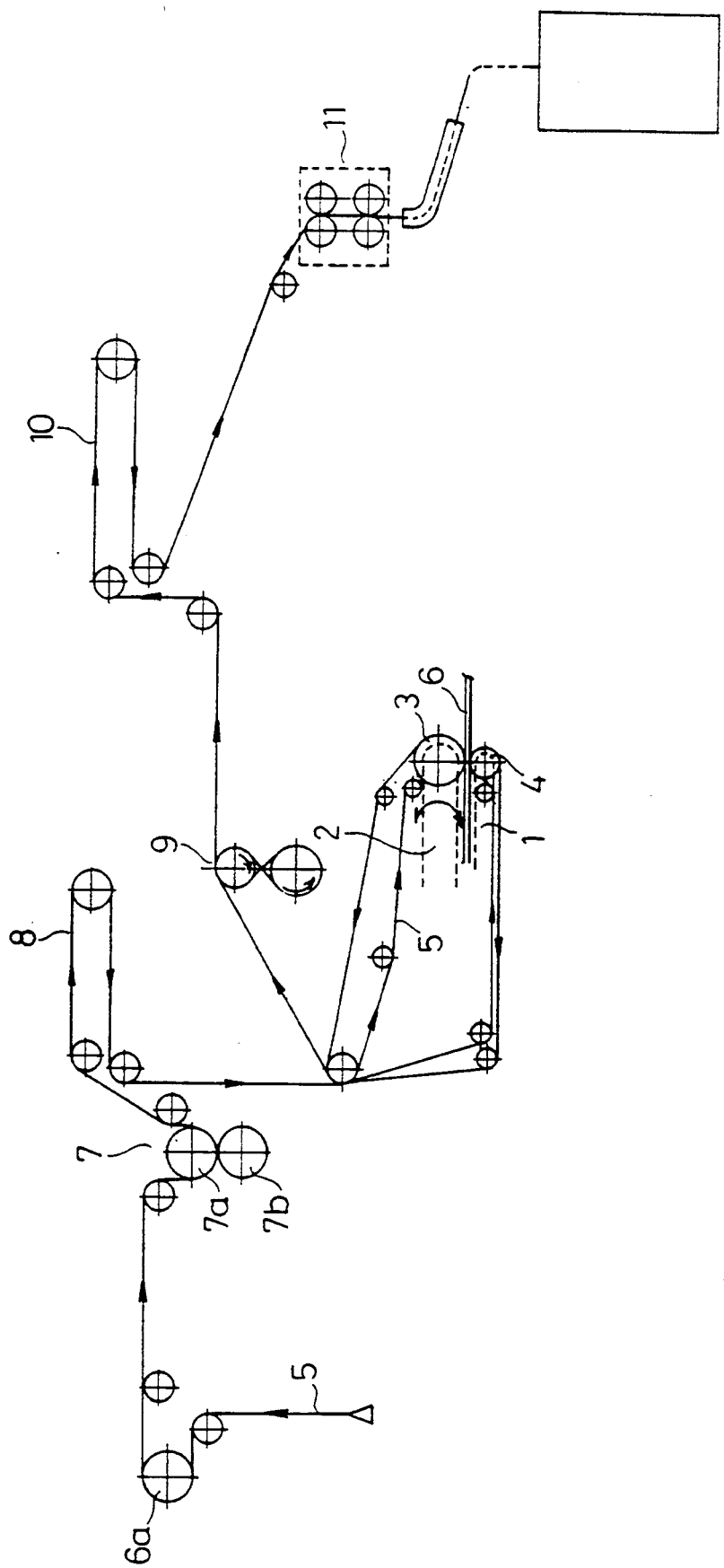
FIG. 6 is a schematic front view showing a prior art wire re-use apparatus.

Referring to FIG. 1, designated at 20 is a feed roller. A copper wire, which has been used in a mash seam welder, for instance a mash seam welder shown in FIG. 6, and having a flattened sectional profile as shown in FIG. 2, is led as a taken-up wire 21 by the feed roller 20. The taken-up wire 21 has been deformed in, for instance, the mash seam welder shown in FIG. 6, i.e., between forming rollers 7a and 7b and also between upper and lower roller electrodes 3 and 4, into a flattened sectional profile. The taken-up wire 21 led from the feed roller 20 is taken up by a first guide unit 22 including guide rollers 221 and 222 and a wire drive roller 223 and then led by a second guide unit 23 including guide rollers 231 and 232 to a wire shape detection unit 24.

The wire shape detection unit 24 passes the taken-up wire 21 irrespective of the surface character thereof. Detection unit 24 detects the surface character of the taken-up wire 21, for instance surface roughness or shape, and it supplies a signal for discontinuing the take-out of the blank sheet from between the mash seam welder. In other words, the rewound wire is supplied to the mash seam welder even if it has a detected defective shape portion. If the welding of a blank sheet is effected while the defective shape portion of the wire is used through the upper and lower roller electrodes, a sound weld zone can not be obtained. Therefore, during this period, the passage of blank sheet between the roller electrodes is inhibited.

More specifically, the taken-up wire 21 is a copper wire having been used once and deformed between the forming rollers and also between the upper and lower roller electrodes into a flattened sectional profile. Depending on the surface character of the blank sheet the contact surfaces of the wire may be rendered coarse, and also the plating metal such as tin may be attached to the contact surfaces. If such wire is taken up and used again as an electrode, the weld property of the weld zone on the welded material, i.e., the lap formed by the overlapped opposite side edges of the blank sheet, is spoiled. For this reason, it is not suitable to take up a defective shape portion of the taken-up wire 21. However, if this spoiled wire portion is cut away, the taken-up wire becomes shorter, and therefore it can no longer be used again for continuous welding by subsequently rewinding it. Accordingly, while the taken-up wire is taken up as such on the taken-up 31 irrespective of whether it has any local defective shape portion, the wire shape detection unit 24 detects the thickness and width of the rewound wire 30 (as shown by the dashed line in FIG. 5). When a wire portion which is quickly reduced in the width and thickness (such as a portion 3011 shown in FIG. 3) is detected and passes between the upper and lower roller electrodes of the mash seam welder, the feed of blank sheet to the mash seam welder is inhibited.

Figure 3:
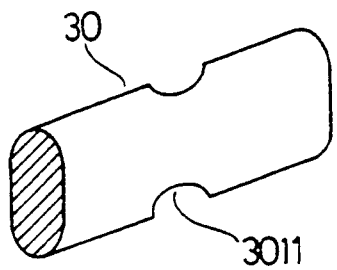
FIG. 3 is a perspective view showing an example of a rewound wire having a defective shape.

When the copper wire is first supplied for mash seam welding between the upper and lower roller electrodes, it has a circular sectional profile, but when it once passes between the forming roller, it is deformed to a flattened sectional profile (see FIG. 2). At the time of the welding, a blank sheet or like material having a predetermined length is passed in a state sandwiched between copper wires having a flattened sectional profile between the upper and lower roller electrodes, whereby it is mashed between the electrodes to effect mash seam welding. Considering the lap of the blank sheet to be welded, however, excess current flows through its opposite edges compared to the intermediate portion. This means that excess current flows through copper wire portions in contact with the edges of the lap. Therefore, portions of the copper wire carrying excess current are liable to be fused. This tendency is pronounced with a leading portion of a first blank sheet in a rot and a trailing portion of the last blank sheet when the blank sheets of the rot are supplied one by one. The portions noted above are locally heated, and only the heated portions appear as the reduced portion 3011 as shown in FIG. 3. Generally, the reduced portion 3011 is liable to appear particularly at the start and end of a welding cycle, in which a plurality of blanks are welded sucessively. The wire shape detection unit 24 detects the reduced portion 3011 having a reduced circumferential dimension by measuring the thickness and width of the rewound wire 30 being rewound. When such reduced portion 3011 is used, in this portion the rewound wire 30 fails to be in contact with but is floated from the upper roller electrode and also the lap to be welded. Therefore, with this portion, sufficient heat generation welding can not be obtained, thus resulting in a weld having a local welding defect. Such welding defect will cause generation of a fissure and leakage. This means that wire with the reduced portion 3011 cannot be used for welding. The surface roughness, wich influences the welding property, may also be detected in addition to the thickness and width as the shape of the rewound wire 30.

The wire shape detection unit 24 may have any construction so long as it can measure the thickness and width of wire accurately. For highly accurate and quick detection, the unit can utilize optical detection. More specifically, the unit 24 is provided with a light projection section and a light reception section. The rewound wire 30 is passed through the space between the light projection and reception sections, while projecting at least two ultraviolet beams from the light projection section. The shade of the ultraviolet beams produced by the passage of the reduced portion of the wire and that produced by the passage of the normal portion of the wire are different in size, thus permitting highly accurate measurement of the width and thickness.

After the wire shape detection unit 24 a stretching unit 25 having a vertically displaceable roller 251 is provided. The unit 25 provides a fixed tension to the taken-up wire 21 or rewound wire 30 to hold the wire taut and without loosening. The stretching unit 25 may have any structure so long as it can provide a fixed tension to the taken-up or rewound wire 21 or 30. In the case of FIG. 1, the stretching unit 25 has a vertically displaceable roller 251, which can be displaced vertically along a vertical guide 252. Thus, with the taken-up wire 21 wound on the vertically displaceable roller 251, the tension in the taken-up wire 21 can be held fixed depending on the position of the vertically displaceable roller 251. In other words, by holding the vertically displaceable roller 251 at a fixed position, the taken-up wire 21 or rewound wire 30 can be taken up or rewound with a fixed tension in the wire.

In addition to the structure that the vertically displaceable roller 251 is vertically displaceable along the vertical guide 252, suitably the rotational number of the drum 28 can be controlled according to the position of the vertically displaceable roller 251. Then the taken-up wire 21 is taken up, it is wound on the preceding taken-up wire 21. Therefore, the take-up diameter of the wire being wound on the drum 28 increases. In reverse operation, the rewound diameter of the rewound wire 30 reduces. The tension in the taken-up wire 21 or rewound wire 30 varies with the varying take-up or rewound diameter. This means that the rotaional number of the drum 28 should be varied in correspondence to the tension variation in order to obtain regular winding of the taken-up wire 21 on the drum or smooth rewinding of the rewound wire 30. That is, the rotaional number of the drum 28 should be controlled according to the taken-up or rewound diameter of the wire on the drum 28. Accordingly, a position detection unit 26 is provided on one side of the vertically displaceable roller 251 for detecting the position of the vertically displaceable roller 251, and the rotational number of the drum 28 is controlled according to a position detection signal from the unit 26. The position detection unit 26 may have any structure; for instance it may detect the position of the vertically displaceable roller 251 as a voltage change for controlling the rotational number of the drum according to this voltage change, or it may optically detect the position of the vertically displaceable roller 251 with an optical sensor or the like.

After the stretching unit 25 a guide roller 261 and a wire-directing unit 27 are provided. The wire-directing unit 27 is provided for winding the taken-up wire 21 on the drum 28 regularly, i.e., with a gap of 0.02 to 0.2 mm between adjacent wire turns and without overlap of taken-up wire and for smoothly unwinding the rewound wire 30. More specifically, the wire-directing unit 27 is necessary for leading the taken-up wire 21, having been directed such that its flat surface 211 (see FIG. 2) is in contact with the surface of the drum 28, to the surface of the drum 28 in a fixed direction for winding on the drum and also for ensuring constant rewinding of he rewound wire from the drum 28.

Figure 4:
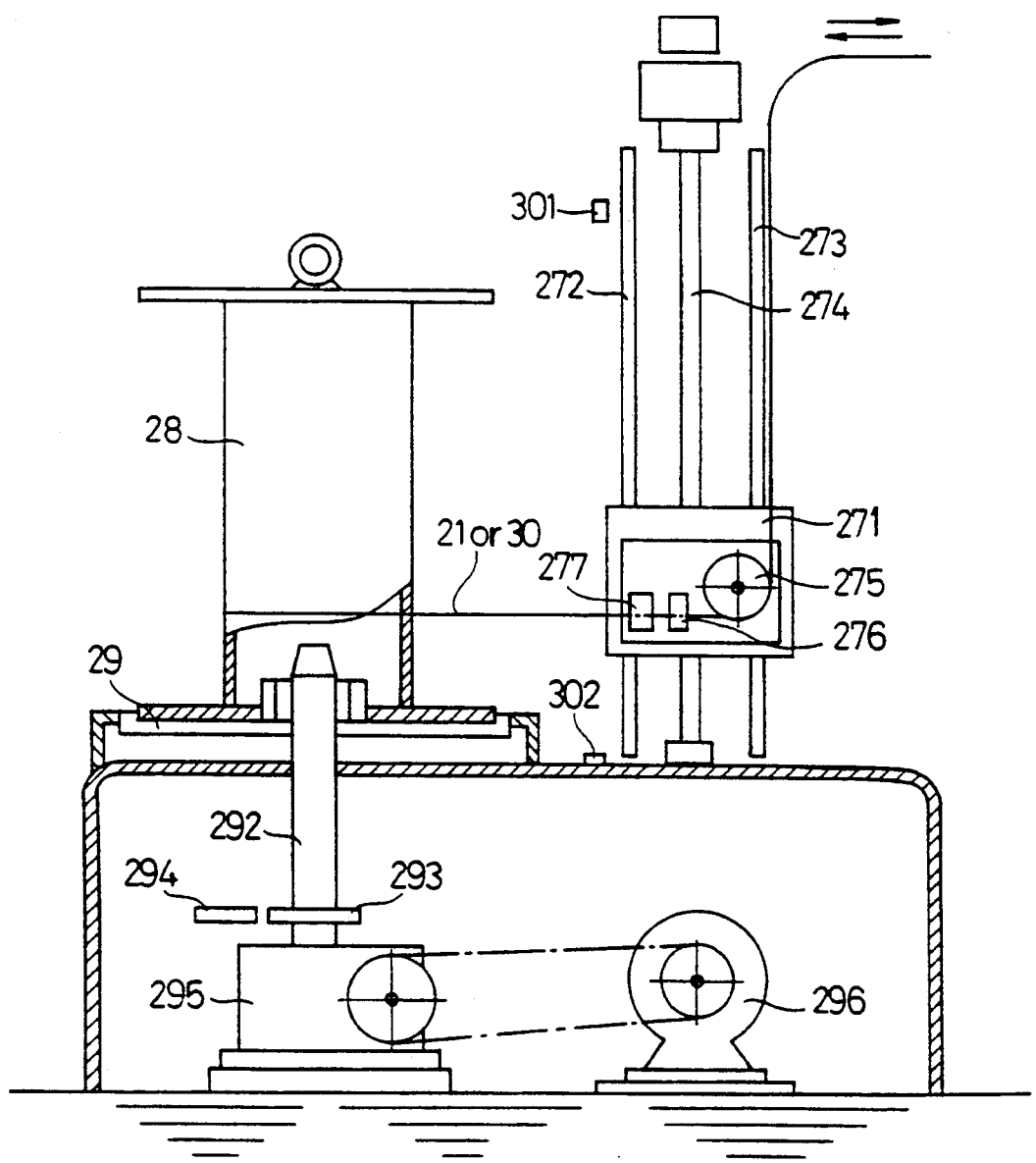
FIG. 4 is schematic front view, partly in section, showing an example of a drum drive mechanism.

The wire-directing unit is made vertically displaceable by a lift mechanism. The lift mechanism may be a chain mechanism, a pneumatic or oil gydraulic mechanism, a pinion-and-rack mechanism in the case of FIG. 1 and 4. More specifically, as shown in FIGS. 1 and 4, it includes a vertically displaceable block 271, guide rods 272 and 273 and a ball screw 274. The wire-directing unit 27 is provided together with a guide roller 275 and a clamp unit 276 on the vertically displaceable block 271. With the rotation of the ball screw 274 the vertically displaceable block 271 is desplaced vertically along the guide rods 272 and 273.

More specifically, the taken-up wire 21 having been led round the guide roller 275 enters the clamp unit 276. In the take-up wire 21 to a direction such that the flat surface of the wire can be in contact with the surface of the drum 28. The wire-directing unit 27 serves to hold the taken-up wire 21, to be wound on the drum 28, at a fixed angle, preferably horizontally, as the wire is wound on the drum 28.

The vertically displaceable block 271, clamp unit 276 and wire-direction unit 27 each may have any structure so long as their roles can be fulfilled.

The drum 28 suitably is of a vertical type and rests on and is rotated in unison with the turn-table 29. This is so because the drum 28 merely resting on the turn-table 29 can be readily replaced and the clamp unit 276 structurally readily permits repair when the taken-up or rewound wire 21 or 30 is broken.

More specifically, as shown in FIG. 4, the turn-table 29 is provided with a shaft 292, which is driven from a drive motor 296 via a speed change unit 295. To detect the rotation of the shaft 292 a rotation detection mechanism is provided, which includes a detection disk 293 having a notch or the like and a sensor 294. The rotation detection mechanism may use a circular code or the like. The rotational torque from the drive motor 296 is transmitted via the speed change unit 295 to the shaft 292, and the turn-table 29 is rotated by the speed-changed rotational torque. With the rotation detection mechanism consisting of the detection disk 293 and sensor 294, for every unit rotation of the turn-table 29 a marked position, i.e., a notched position, of the detection disk 293 is detected by the sensor 294.

Where the rotation of the drum 28 rotated in unison with the turn-table 29 can be detected for every unit rotation, the taken-up wire 21 can be wound on the drum 28 substantially closely, for instance with a gap of 0.1 mm or smaller between adjacent wire turns and without overlap thereof by causing an ascent or a descent of the vertically displaceable block 271 for every unit rotation.

For automatically attaining this regular take-up, the vertically displaceable block 271 is raised or lowered by a unit distance according to a detection signal provided for every unit rotation from the sensor 294. Meanwhile, upper and lower limit position sensors 301 and 302 are provided on one side of the vertically displaceable block 271, as shown in FIG. 4. The vertically displaceable block 271 thus is adapted to be raised and lowered between its upper and lower limit positions detectedby the respective sensors 301 and 302.

More specifically, the vertically displaceable block 271 is raised and lowered with the rotation of the ball screw 274, and particulary it is raised and lowered by a unit distance with the rotation of the ball screw 274. The vertically displaceable block 271 carries the guide roller 275, clamp unit 276 and wire-directing unit 27. The taken-up wire 21 is led round the guide roller 275 to enter the clamp unit 276 and wire-directing unit 27 so as to be taken up on the drum 28. As the vertically displaceable block 271 is raised or lowered, the position, at which the taken-up wire 21 is taken up on the drum 28, is varied. Therefore, the rotation of the ball screw 274 for causing the ascent or descent of the vertically displaceable block 271 is interlocked to the rotation of the turn-table 29 according to a detection signal of the sensor 294, the taken-up wire 21 is taken up regularly on the drum 28.

More specifically, with the detection of the rotational number of the shaft 292 supporting the turn-table 29 by the rotation detection mechanism consisting of the detection disk 293 and sensor 294, the position of the turn-table 29 is detected for every rotation thereof by the sensor 294, and according to a detection signal from the sensor 294 the ball screw 274 is turned to raise or lower the vertically displaceable block 271 by a predetermined pitch. That is, the vertically displaceable block 271 is raised or lowered according to the progress of the take-up of the taken-up wire 21 on the drum 28. When the upper limit position is reached by the vertically displaceable block 27, the sensor 301 is rendered operative to reverse the direction of rotation of the ball screw 274 so a to cause descent of the vertically displaceable block 271 by unit pitches. When the lower limit position is reached, the sensor 302 is rendered operative to reverse the direction of rotation of the ball screw 274 so as to cause ascent of the vertically displaceable block 271 by unit pitches.

The lift mechanism 274 for the vertically displaceable block 271 can be accomplished with a chain mechanism, an oil hydraulic mechanism, a pinion-and rack mechanism, a ball screw mechanism, or a ratchet mechanism.

Figure 5:
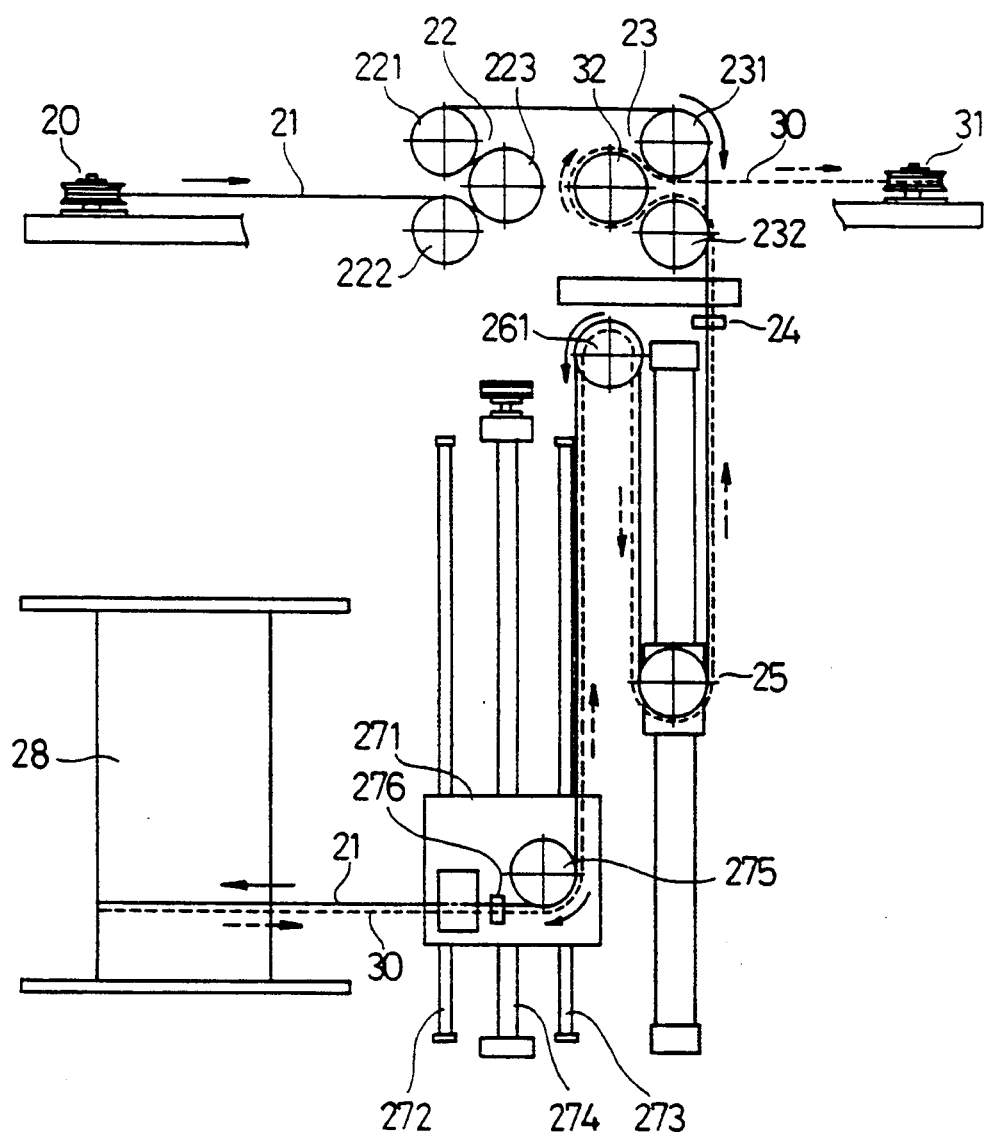
FIG. 5 is a view for explaining the status of take-up or rewinding of wire in the wire re-use apparatus shown in FIG. 1.

After completion of the take-up of the taken-up wire 21 on the drum 28, the wire on the drum 28 may be unwound to a feed-out roller 31 as the rewound wire 30 for re-use as shown in FIG. 5. Both the taken-up wire 21 and rewound wire 30 are constituted by a copper wire having been used once of welding and having a flattened sectional profile. However, the former and latter are different in the running direction through the apparatus; the former is shown by solid line while the latter is shown by dashed line, as shown in FIG. 5.

For rewinding and re-using the wire wound on the drum 28, a feed-out roller 31 is provided in opposition to the feed-out roller 20 as shown in FIG. 1, and a braking unit 32 is provided in the vicinity of the second guide unit 23. During the rewinding, the rewound wire 30 is passed round the braking unit 32 while it is passed round the guide rollers 231 and 232 of the second guide unit 23. It is fed out to the feed-out roller 31 while it is given a brake force in the opposite direction by the braking unit 32. In this way, it is supplied at a constant speed to the mash seam welder.

The braking unit 32, having the outer shape as shown in FIG. 1, mainly consists of a pulley, round which the rewound wire 30 is passed. The pulley is supported for rotation and is sandwiched between pair frictional plates (not shown). It is thus given a braking force by its friction with the frictional plates, and it is thus fed out at a fixed speed from the feed-out roller 31 via the second guide unit 23. Further, the pulley is provided with a clutch commonly called on-way clutch, i.e., a clutch capable of rotation in the direction of feed of the taken-up wire but not in the opposite direction. With the provision of such one-way clutch, even if the taken-up wire 30 sags between the drum 28 and stretching unit 25, the change in the taken-up wire tension is cut out by the braking unit 32 and not transmitted to the mash seam welder, thus permitting stable welding in the mash seam welder.

More specifically, when the taken-up wire is wound on the drum 28 regularly without substantial gap between adjacent wire turns, there is no problem. However, the wire may not be wound perfectly regularly, but some portions of the wire may fail to be wound regularly. In an irregularly wound portion of the wire, the length of taken-up wire which is rewound with one rotation of the drum 28 is greater than the length of rewound wire that is rewound from a regularly wound portion of wire with one rotation of the drum 28. Therefore, when an irregularly wound portion of wire appears during the rewinding, there in an excess length of the rewound wire 30.

If this sagging is brought as such into the welder, satisfactory mash seam welding of the blank sheet lap can no longer be obtained.

However, the braking unit 32 is provided in relation to the second guide unit 23 for providing a reversely directed braking force to the rewound wire 30 led to the welder. Therefore, if the rewound wire sags tentatively to lower the tension in it with rewinding of an irregularly wound portion of wire, the rewound wire 30 ceases to run, i.e., be supplied, to the mash seam welder against the reverse braking force. In addition, in the braking unit 32 the pulley receives the action of the commonly called one-way clutch such that it can be rotated only in the direction of feeding the rewound wire 30 to the welder. Thus, the rewound wire 30 is constantly fed to the welder with a constant tension, without being influenced by any irregularly wound portion.

As has been described in the foregoing, the invention concerns a mash seam welder for mash seam welding a lap formed by overlapped opposite side edges of a metal sheet or the like blank sheet formed into a cylindrical shape, for instance, between upper and lower roller electrodes via copper wires, and specifically a wire re-use apparatus for such mash seam welder, which apparatus serves to take up a copper wire having been used once for welding between upper and lower roller electrodes on a drum as taken-up wire and rewinding the copper wire having been taken up on the drum for supplying it as a rewound wire after a check as to whether it can be re-used for the mash seam welder again for welding between the upper and lower roller electrodes. What are featured by the invention are a wire shape detection unit provided between a taken-up wire feed roller for feeding the taken-up wire and a taken-up wire take-up drum for taking up the taken-up wire fed round the feed roller, the wire shape detection unit serving to detect the shape or the like of the rewound wire rewound to the take-up drum and providing a command to stop the take-out or feed of the blank from the mash seam welder upon detection of a defect in the wire shape or the like, and a wire braking unit provided between the wire shape detection unit and a feed-out roller for delivering the rewound wire to the mash seam welder, the wire braking unit including a clutch unit for providing a brake force to the rewound wire in the direction opposite to the running direction and capable of rotation only in the direction of feed of the rewound wire.

Thus, according to the invention, according to which the wire shape detection unit provided between the feed roller and take-up drum can automatically detect the shape of the copper wire having been used once while the wire is being rewound, it is possible to re-use copper wire which has been locally deformed and used before. In addition, the wire braking unit is provided betweeen the taken-up drum and feed-out roller, the rewound wire being supplied to the welder through the braking unit. Thus, the rewound wire can be fed with a constant tension or at a constant speed and without any possibility for any trouble during the unwinding of the wire for reuse by the mash seam welder.

I claim:

1. An apparatus for re-using a copper wire having been used once for mash seam welding in a mash seam welder for mash seam welding a lap formed by overlapped opposite side edges of a metal blank between upper and lower roller electrodes, said apparatus for taking up the copper wire having been squeezed to have a substantially flat sectional profile and used once for mash seam welding, as taken-up wire and feeding said taken-up wire as rewound wire to said mash seam welder to be used again for welding between said upper and lower roller electrodes, said apparatus comprising:

a wire shape detection unit provided between a taken-up wire feed roller, for feeding said taken-up wire, and a taken-up wire take-up drum, for taking up said taken-up wire from said taken-up feed roller, said wire shape detection unit detecting the characteristics of said rewound wire rewound from said take-up drum and providing a command to stop the transport of said metal blank from said mash seam welder upon detection of a defect in said rewound wire characteristics; and a wire braking unit provided between said wire shape detection unit and a feed-out roller for delivering said rewound wire to said mash seam welder, said wire braking unit including a clutch unit for braking said rewound wire in a direction opposite to a feed direction of said rewound wire and rotating only in said feed direction of said rewound wire.

2. The apparatus for re-using a copper wire having been used once for mash seam welding according to claim 1, which further comprises a turn-table carrying said take-up drum installed thereon, said turn-table having a shaft coaxial with the axis of said take-up drum, and having a rotational number sensor for detecting a rotational number of said turn-table.

3. The apparatus for re-using a copper wire having been used once for mash seam welding according to claim 1, which further comprises a stretching unit provided between said wire shape detection unit and said take-up drum, said stretching unit providing a fixed tension in one of said taken-up wire and said rewound wire.

4. The apparatus for re-using a copper wire having been used once for mash seam welding according to claim 1, which further comprises a stretching unit provided between said wire shape detection unit and said take-up drum, said stretching unit including a vertically displaceable roller for one of said taken-up wire and said rewound wire wound thereon and including a position sensor for detecting the lower limit position of said vertically displaceable roller.

5. The apparatus for re-using a copper wire having been used once for mash seam welding according to claim 1, which further comprises a wire-directing unit provided between said wire shape detection unit and said take-up drum, said wire-directing unit being vertically displaceable in accordance with the progress of take-up of said taken-up wire, and holding said taken-up wire to be taken up on said take-up drum in a fixed direction with respect to said take-up drum.

6. The apparatus for re-using a copper wire having been used once for mash seam welding according to claim 5, which further comprises position sensors disposed respectively at upper and lower limit positions of vertical displacement of said wire-directing unit.

7. The apparatus for re-using a copper wire having been used once for mash seam welding according to claim 2, wherein said rotational number sensor supplies a rotational number of said turn-table to a wire-directing unit.

8. An apparatus in which a copper wire, having been used once during a mash seam welding process using a mash seam welder employing upper and lower roller electrodes and said copper wire interposed therebetween, is used again in said mash seam welding process, and in which said apparatus comprises:

a feed roller for taking up said copper wire thereon as a taken-up wire;

a take-up drum for taking up said copper wire unwound and fed from said feed roller;

a wire shape detection unit, disposed between said feed roller and said take-up drum, for detecting the characteristics of said copper wire unwound as a rewound wire from said take-up drum and further providing a command to stop the transport of a metal blank, to be welded, to said mash seam welder upon detection of a defect in said rewound wire characteristics; and a wire braking unit provided between said wire shape detection unit and a feed-out roller for delivering said rewound wire to said mash seam welder, said wire braking unit including a clutch unit for braking said rewound wire in a direction opposite to a feed direction of said rewound wire and rotating only in the direction of feed of said rewound wire.

9. The apparatus according to claim 8, in which said apparatus further comprises a turn-table carrying said take-up drum installed thereon, said turn-table having a shaft coaxial with the axis of said take-up drum, and having a rotational number sensor for detecting a rotating rate of said turn-table.

10. The apparatus according to claim 8, in which said apparatus further comprises a stretching unit provided between said wire shape detection unit and said take-up drum, said stretching unit providing a fixed tension in one of said taken-up wire and rewound wire.

11. The apparatus according to claim 8, in which said apparatus further comprises a stretching unit provided between said wire shape detection unit and said take-up drum, said stretching unit including a vertically displaceable roller for one of said taken-up wire and rewound wire wound thereon and including a position sensor for detecting the lower limit position of said vertically displaceable roller.

12. The apparatus according to claim 8, in which said apparatus further comprises a wire-directing unit provided between said wire shape detection unit and said take-up drum, said wire-directing unit being vertically displaceable in accordance with the progress of take-up of said taken-up wire, and holding said taken-up wire to be taken up on said take-up drum in a fixed direction with respect to said take-up drum.

13. The apparatus according to claim 12, in which said apparatus further comprises position sensors disposed respectively at upper and lower limit positions of vertical displacement of said wire-directing unit.

14. The apparatus according to claim 9, wherein said rotational number sensor supplies a rotational number of said turn-table to a wire-directing unit.

* * * * *